(12) United States Patent
Demerath et al.

(10) Patent No.: US 7,201,650 B2
(45) Date of Patent: Apr. 10, 2007

(54) AIR VENT FOR A VENTILATION SYSTEM

(75) Inventors: Michael Demerath, Hüffler (DE);
Markus Bittcher, Kreuztal (DE)

(73) Assignee: TRW Automotive Electronics & Components GmbH & Co. KG, Enkenbach- Alesborn (DE)

( * ) Notice: Subject to any disclaimer, the term of this patent is extended or adjusted under 35 U.S.C. 154(b) by 191 days.

(21) Appl. No.: 10/791,206

(22) Filed: Mar. 2, 2004

(65) Prior Publication Data
US 2004/0224625 A1    Nov. 11, 2004

(30) Foreign Application Priority Data
Mar. 3, 2003  (DE) .............. 203 03 401 U (51) Int. Cl.
*B60H 1/34* (2006.01)
(52) U.S. Cl. ............... 454/154; 454/155; 454/286; 454/306
(58) Field of Classification Search ............... 454/152, 454/154, 155, 284, 286, 297–300, 305, 306 454/309–311
See application file for complete search history.

(56) References Cited

U.S. PATENT DOCUMENTS

| 4,253,384 A | * | 3/1981 | Schmidt et al. ............. 454/284 |
| 4,437,392 A |   | 3/1984 | Stouffer |
| 4,637,298 A |   | 1/1987 | Yoshikawa et al. |
| 5,297,989 A | * | 3/1994 | Stouffer et al. ............. 454/155 |
| 5,356,336 A | * | 10/1994 | Stouffer et al. ............. 454/155 |
| 5,816,907 A | * | 10/1998 | Crockett ..................... 454/155 |
| 2002/0177398 A1 |   | 11/2002 | Duriez et al. |

FOREIGN PATENT DOCUMENTS

| DE | 19508983 | 2/1996 |
| DE | 19721831 | 11/1998 |
| DE | 100 11 932 | 3/2001 |
| DE | 10011932 | 3/2001 |
| EP | 0 879 718 | 11/1998 |
| GB | 2292797 | 3/1996 |

* cited by examiner

*Primary Examiner*—Gregory Wilson
(74) *Attorney, Agent, or Firm*—Tarolli, Sundheim, Covell & Tummino LLP (57) ABSTRACT

An air vent for a ventilation system in a vehicle is disclosed that has an air circulation chamber (1) defined by a housing (9) that has a generally bulged shape. An inflow duct (2) is connected to this housing and opens into the circulation chamber (1), the housing having a perforated wall area (3). An air stream, in use, enters the circulation chamber (1) through inflow duct (2), circulates through the air circulation chamber and exits through the perforated wall area. The air vent further comprises a movable air deflection member disposed to deflect the air stream transversely to an axial direction of the inflow duct.

5 Claims, 9 Drawing Sheets

AIR VENT FOR A VENTILATION SYSTEM

FIELD OF INVENTION

The invention relates to an air vent for a ventilation system in a vehicle.

BACKGROUND OF THE INVENTION

With the known ventilation systems, the air emerges through outflow vents having air guide elements such as vanes or rotating cages that are usually adjustable and near the outlet surface. The appearance of the outlet surface is characterized by the position of the guide elements and is not uniform. A covering of the guide elements on the outlet surface with a grid or the like is not possible since the orienting effect would be lost with such a covering.

Air vents are also known that have a diffusing effect. With these, the outlet surface can have a uniform appearance, but no orienting effect is possible, so that outflow devices with a diffusing effect are installed in the vehicle in addition to those with an orienting effect when both modes of air distribution are to be provided.

DE 197 21 831 A1 describes an air outflow device for the interior of a vehicle, comprising an air outlet element that can be rotated around an axis and that is provided with passages. Depending on the position of the air outlet element, the air is fed into the passenger compartment in a diffused or in a directed manner. The outlet surface changes its appearance, depending on the position of this air outlet element.

DE 100 11 932 C1 discloses a device for feeding air into a passenger compartment, the device being provided with two air outflow openings. Here, one air outflow opening serves for direct ventilation and the second for a diffuse air feeding.

SUMMARY OF THE INVENTION

The present invention provides an air vent that, irrespective of its setting, has a uniform appearance of the outlet surface and permits any mode of air distribution.

Specifically, the invention provides an air vent for a ventilation system in a vehicle, with an air circulation chamber which is defined by a housing that has a generally bulged shape. An inflow duct is connected to the housing of the circulation chamber and opens in it. The housing has a perforated wall area. In use an air stream enters the circulation chamber through the inflow duct, circulates through the air circulation chamber and exits through the perforated wall area. The air vent further comprises a movable air deflection member that is disposed to deflect the air stream transversely to an axial direction of the inflow duct.

The bulged circulation chamber and the arrangement of a movable air deflection member that deflects the air stream transversely to the axial direction of the inflowing air stream cause a partial air flow to rotate inside the circulation chamber. Through the use of the movable air deflection member, the direction of rotation of the partial air flow in the circulation chamber can be varied as desired. As a result of the rotation, a speed component is formed that is parallel to the perforated wall area that forms an outlet surface. The emerging air is deflected correspondingly. In other words, in certain areas of the bulged circulation chamber, the air flow passes along the inside wall and maintains its direction as it emerges from the circulation chamber. Even by a cover grid this direction is not influenced.

In one embodiment, the air deflection member is located opposite the perforated wall area at an end of the inflow duct and has a generally ball-shaped body. It is rotatably accommodated in an annular bearing set in the end of the inflow duct. The air deflection member defines a channel section of cylindrical shape that extends diametrically through the ball-shaped body.

With such an air deflection member, the inflowing air stream can be guided directly along the inside of the housing, causing a rotation of a partial air stream. The air deflection member being located opposite the perforated wall area, the air stream can be guided along the housing inner side in any direction.

In a preferred embodiment, an air guide is arranged in the air circulation chamber adjacent to the perforated wall area. With this air guide that is situated inside the circulation chamber, the deflection of the air flow already caused by the rotation effect can be further intensified. This air guide can be designed in such a way that it can simultaneously be used as a support plate for a fine-meshed cover grid. The air guide can include a set of straight baffle members which are pivotally mounted in the air circulation chamber upstream of the perforated wall area. The setting of these baffle members can either support the directed air flow or rather diffuse the air stream.

In another embodiment, the air deflection member consists of a shield member. This shield member can be shifted in an axial direction inside the air circulation chamber. It is also possible to move the shield member into a shut-off position in which it closes the inflow duct. In this manner, a change in the direction of the outflowing air as well as a complete interruption of the air stream can be achieved with just one air deflection member, the shield member.

In a preferred embodiment, the shield member interacts with an annular diffuser structure. Here, the diffuser structure as well as the shield member are movable inside the air circulation chamber. Depending on the position of the shield member and the diffuser structure relative to each other, the same air vent can achieve a diffuse or a directed ventilation of the passenger compartment. In a covered position, the shield member covers the diffuser structure. There, the diffuser structure has no influence on the deflection of the directed air flow by the shield member. The diffuser structure is only effective when it is placed near the perforated wall area of the circulation chamber, since only then air does flow through it.

In a preferred embodiment, the perforated wall area is formed by a fine-meshed grid. This arrangement gives the visible front of the air vent a uniform appearance.

Further features of the air vent according to the invention ensue from the claims and the following description with reference to the accompanying figures. These figures show the following:

DETAIL DESCRIPTION OF THE INVENTION

Figure 1:
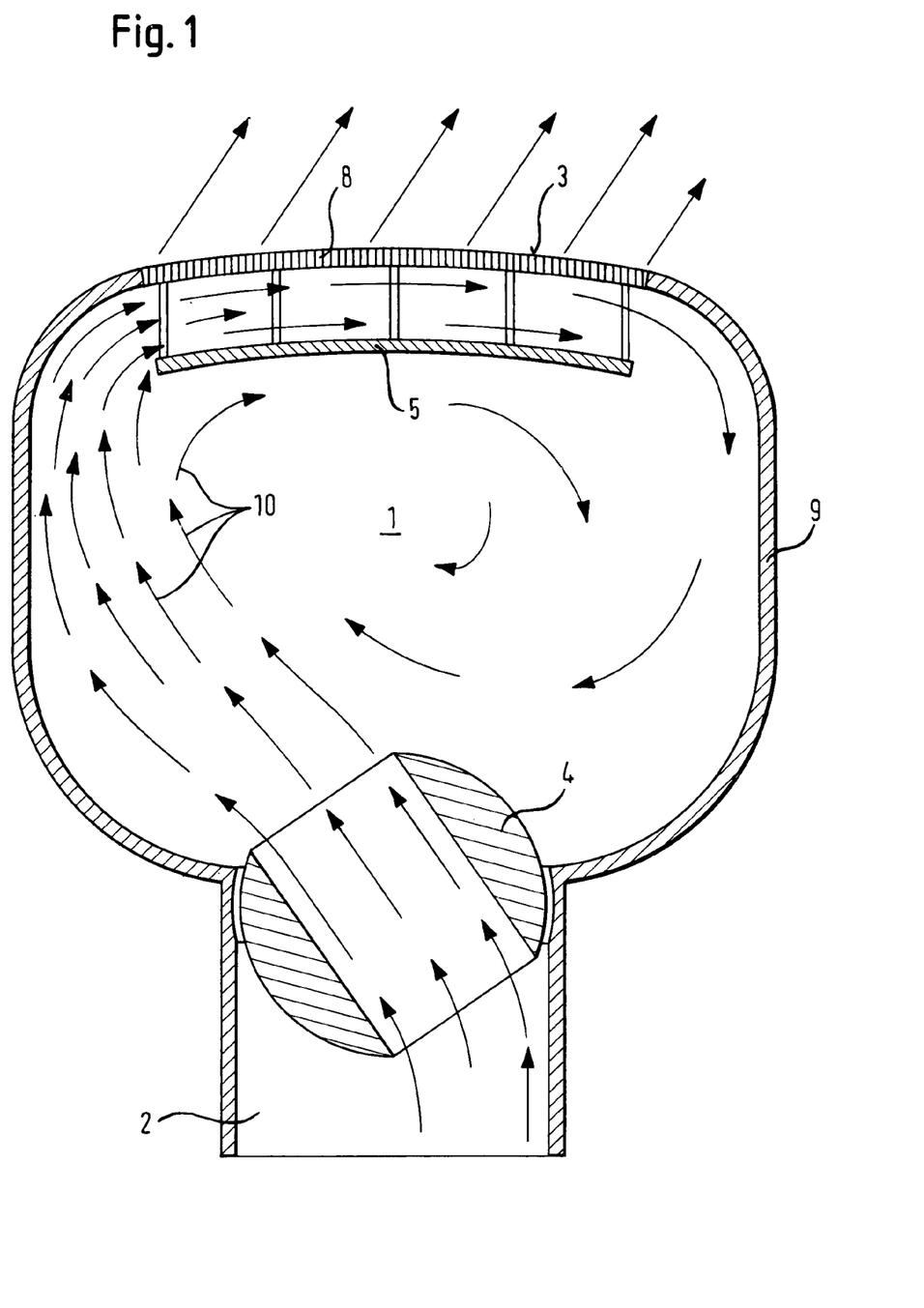
FIG. 1 is a section through an air vent according to the invention.

The air vent has a generally rectangular frame 10 with to pairs of opposed frame sections. The longer ones 10a, 10b of opposed frame sections are spanned by a plurality of ribs 11. The frame with the ribs 11 is injection-molded from a plastic material. An antenna is incorporated in the frame. specifically, the antenna has a generally T-shaped metallic body 12 with a first branch 12a that spans the frame sections 10a, 10b centrally of the frame and a second branch 12b perpendicular to the first branch 12a and extending along frame section 12b.

Figure 2:
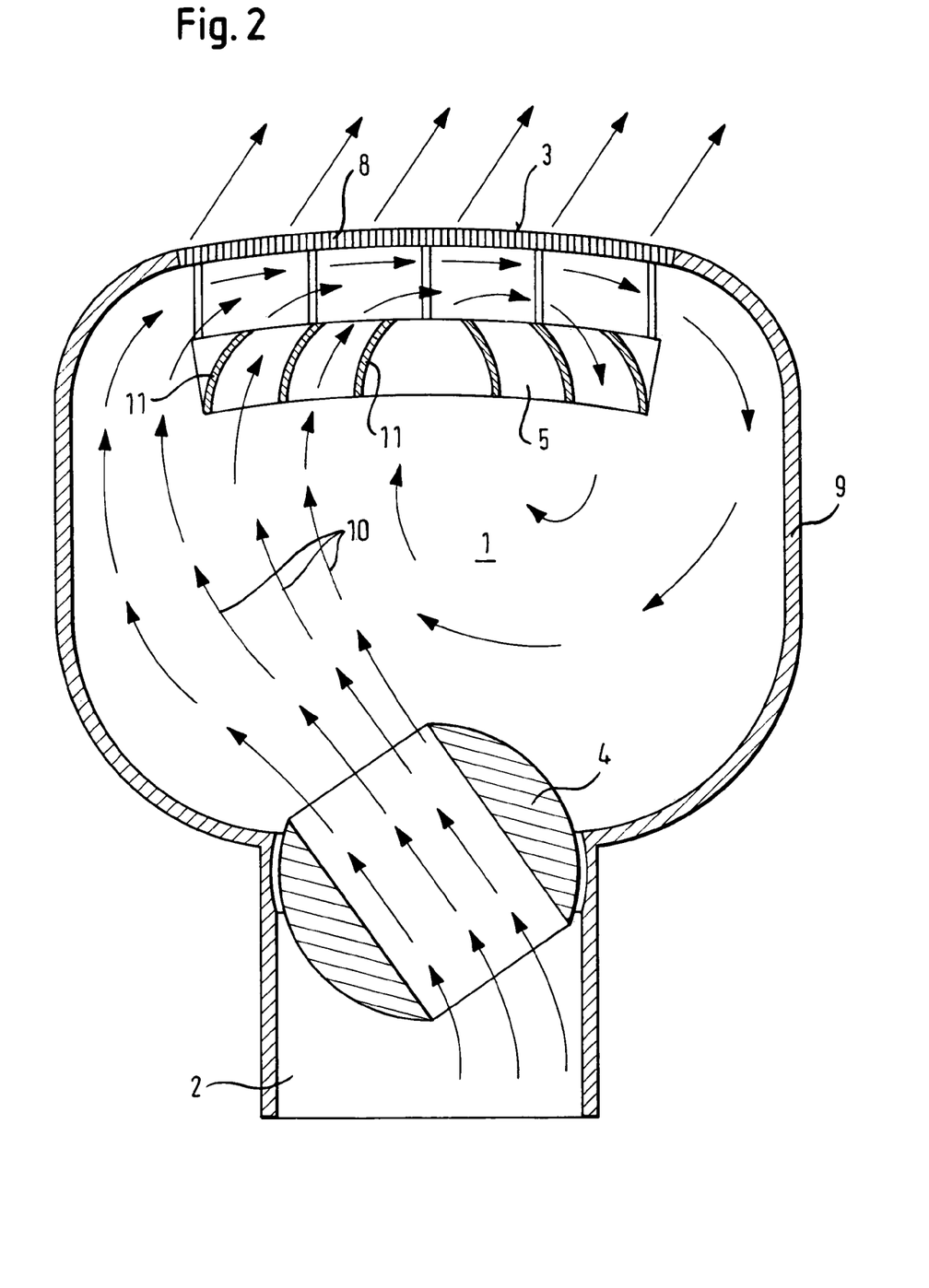
FIG. 2 is a section through another embodiment of the air vent.

FIG. 2 shows an embodiment that is slightly modified with respect to that of FIG. 1. Air guide 5 includes here a set of curved baffle members 11 at fixed positions upstream of perforated wall area 3. A partial air flow inside circulation chamber 1 is imparted with a circular movement determined by the position of movable air deflection member 4. Compared to the embodiment of FIG. 1, the air flow in FIG. 2, indicated by arrows 10, is hindered to a lesser extent. Curved baffle members 11 are arranged in such a way that they intensify the deflection of the air emerging from air circulation chamber 1 and promote a partial rotating flow within the chamber 1.

Figure 3:
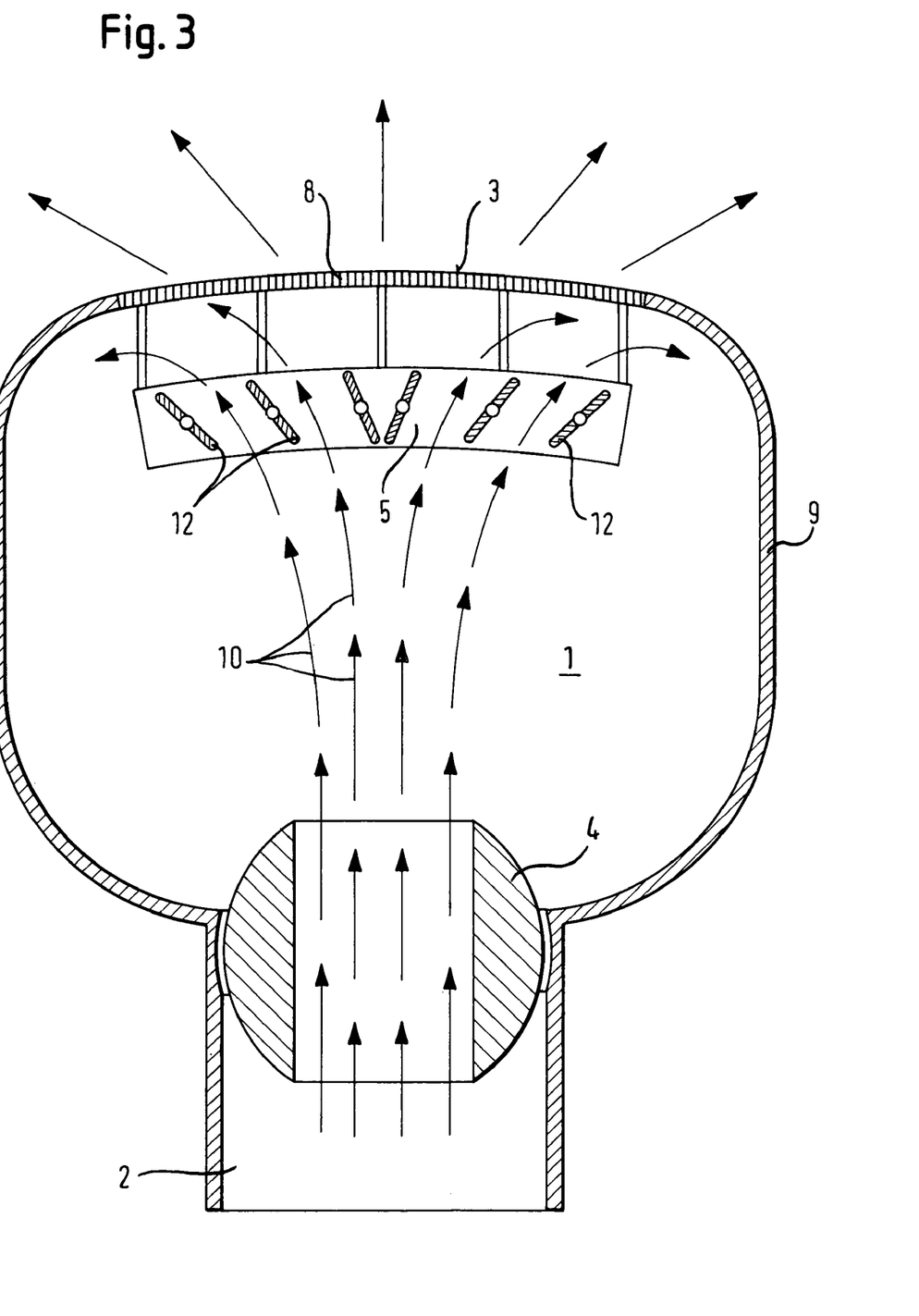
FIG. 3 is a section through another embodiment of the air vent according to the invention.

In another embodiment, shown in FIG. 3, air guide 5, which is arranged adjacent to perforated wall area 3 inside air circulation chamber 1, includes a set of straight baffle members 12 that are pivotally mounted in air circulation chamber 1 upstream of perforated wall area 3. With the positions of air deflection member 4 and straight baffle members 12 as shown in FIG. 3, a diffuse air outflow is generated. If a circulation of the air flow inside the circulation chamber 1 is achieved by directing the air deflection member 4 as shown in FIGS. 1 and 2, then this directed air outflow can once again be intensified by a suitable position of straight baffle members 12.

Figure 4:
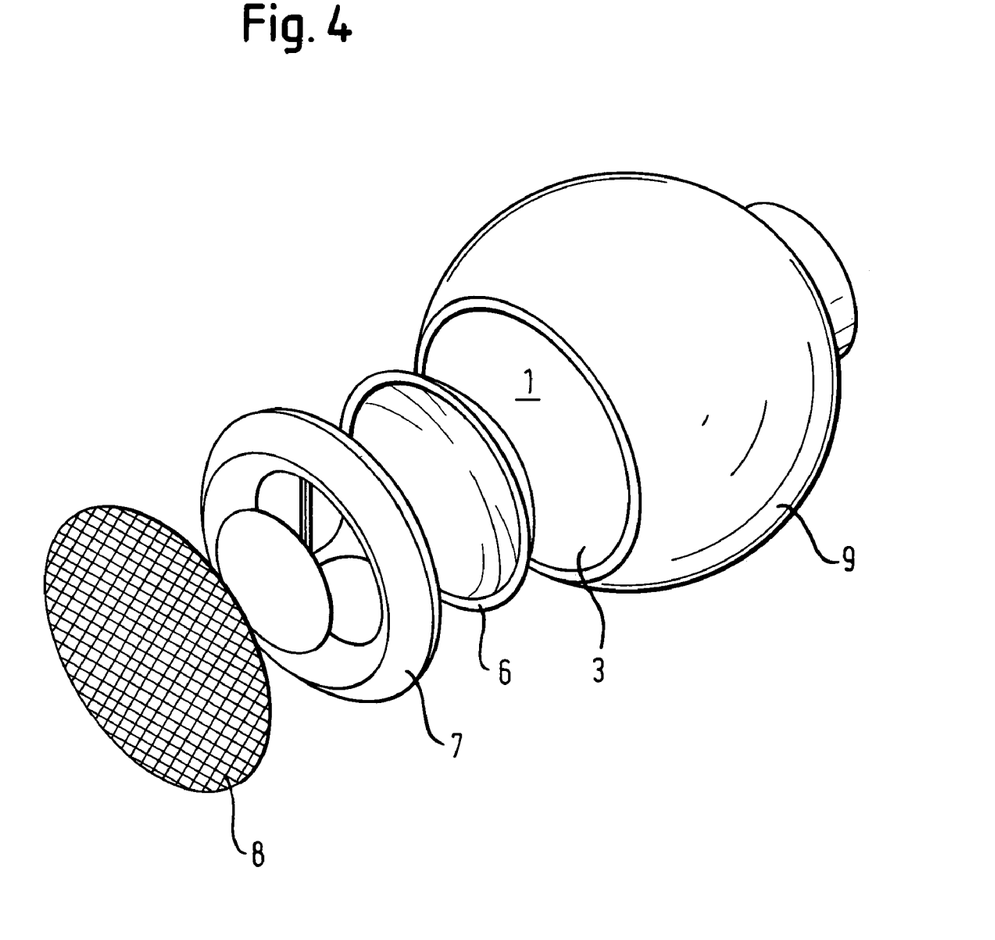
FIG. 4 is an exploded view of another embodiment of an air vent according to the invention.

FIG. 4 shows an exploded view of another embodiment with an air circulation chamber 1, a shield member 6, a diffuser structure 7, and a fine-meshed grid 8. Shield member 6 arranged inside air circulation chamber 1 serves to generate an air circulation inside the bulged circulation chamber 1. Shield member 6 has a convexly curved face. Here, the air flow is guided between shield member 6 and housing 9 of air circulation chamber 1. The diffuser structure 7 arranged inside the circulation chamber can either be covered by shield member 6 or else it can be moved into the air flow so that a diffuse air outflow is made possible. The fine-meshed grid 8 serves to cover the air vent and provides a uniform appearance.

Figure 5:
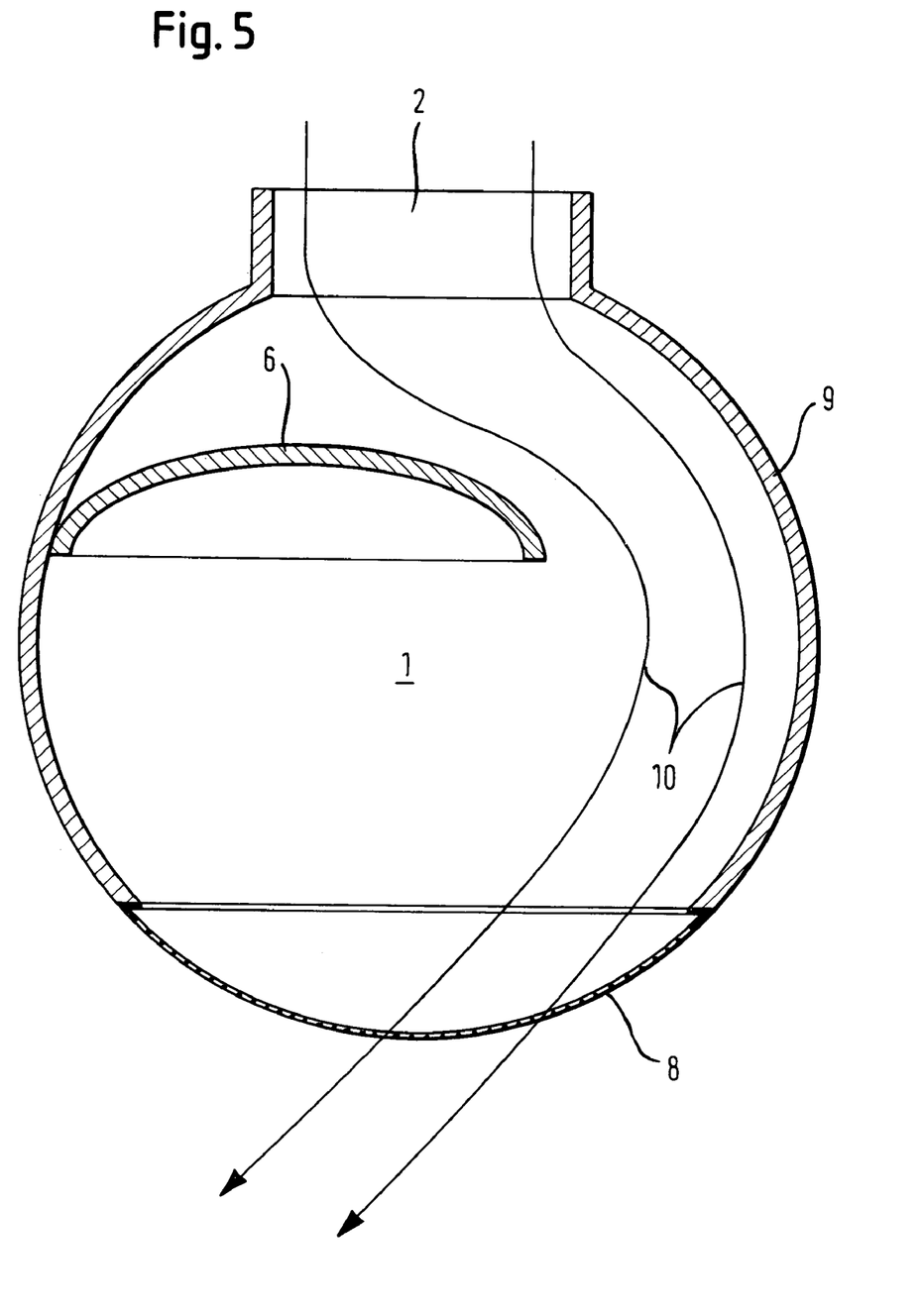
FIG. 5 is a section through an embodiment with a shield member that can be moved transversely to the axial direction.
Figure 6:
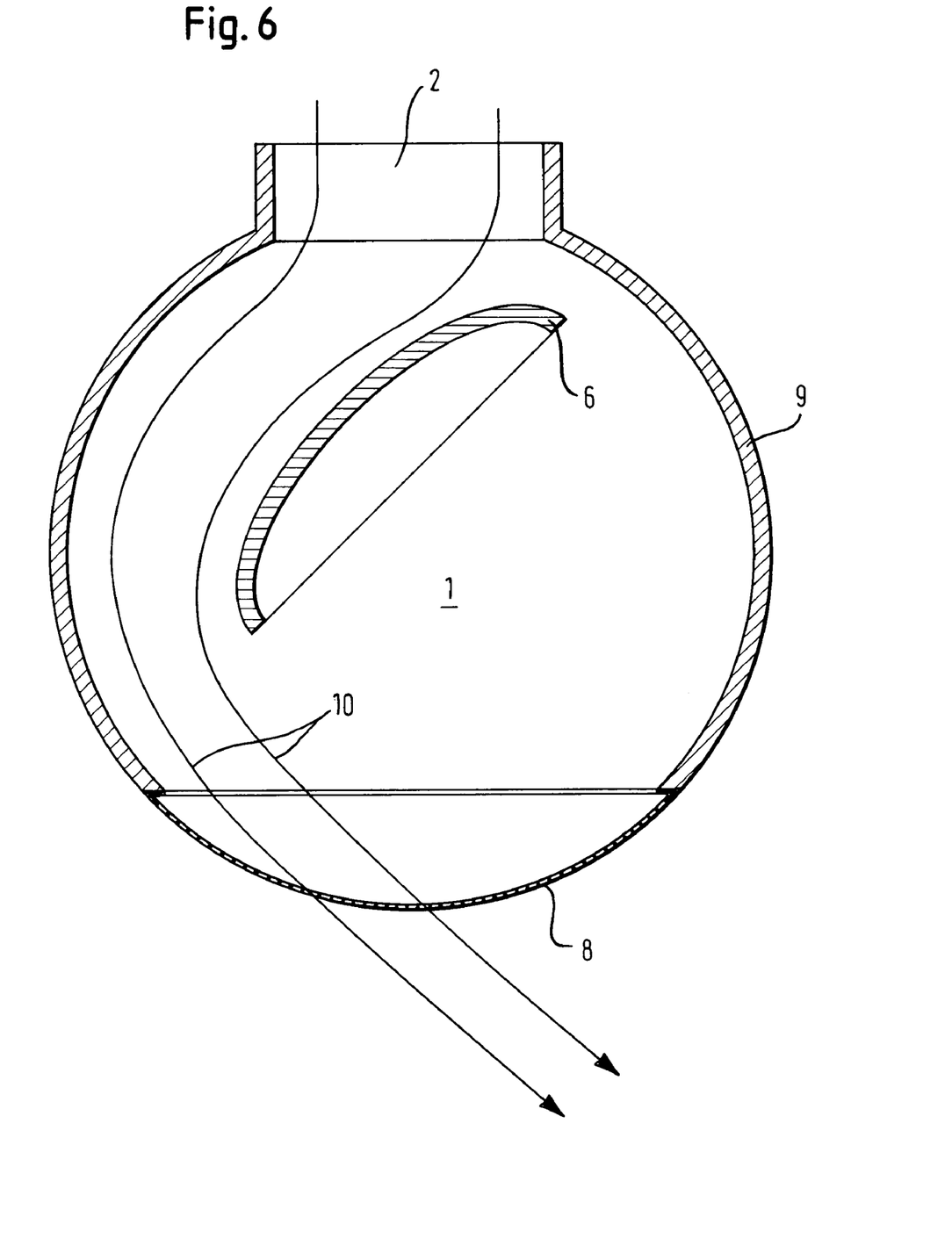
FIG. 6 is a section through an air vent according to the invention with a shield member that is mounted for pivotal movement.

FIGS. 5 and 6 each show a section through an air vent corresponding to the exploded view of FIG. 4, but without showing a diffuser structure. Air circulation chamber 1 with a bulged shape is surrounded by housing 9 with a generally spherical shape. Via inflow duct 2, air enters air circulation chamber 1. The convexly curved face of shield member 6 is exposed to the entering air stream. The perforated wall area is formed by a fine-meshed grid 8. In FIG. 5, shield member 6 which is circular in shape is mounted to be movable transversely to the axial direction. In the position shown, the air flow can only pass shield member 6 on the right-hand side and it comes to lie against the housing wall 9 of air circulation chamber 1. The air flow retains its direction, even after passing through the grid 8.

As shown in FIG. 6, shield member 6 may be mounted for pivotal movement about a pivotal axis that is perpendicular to the axial direction. Here, too, an air flow 10 passes between the inner wall of housing 9 of circulation chamber 1 and shield member 6. The air flow passes through the fine-meshed grid 8 and leaves the air vent in a directed manner.

Figure 7:
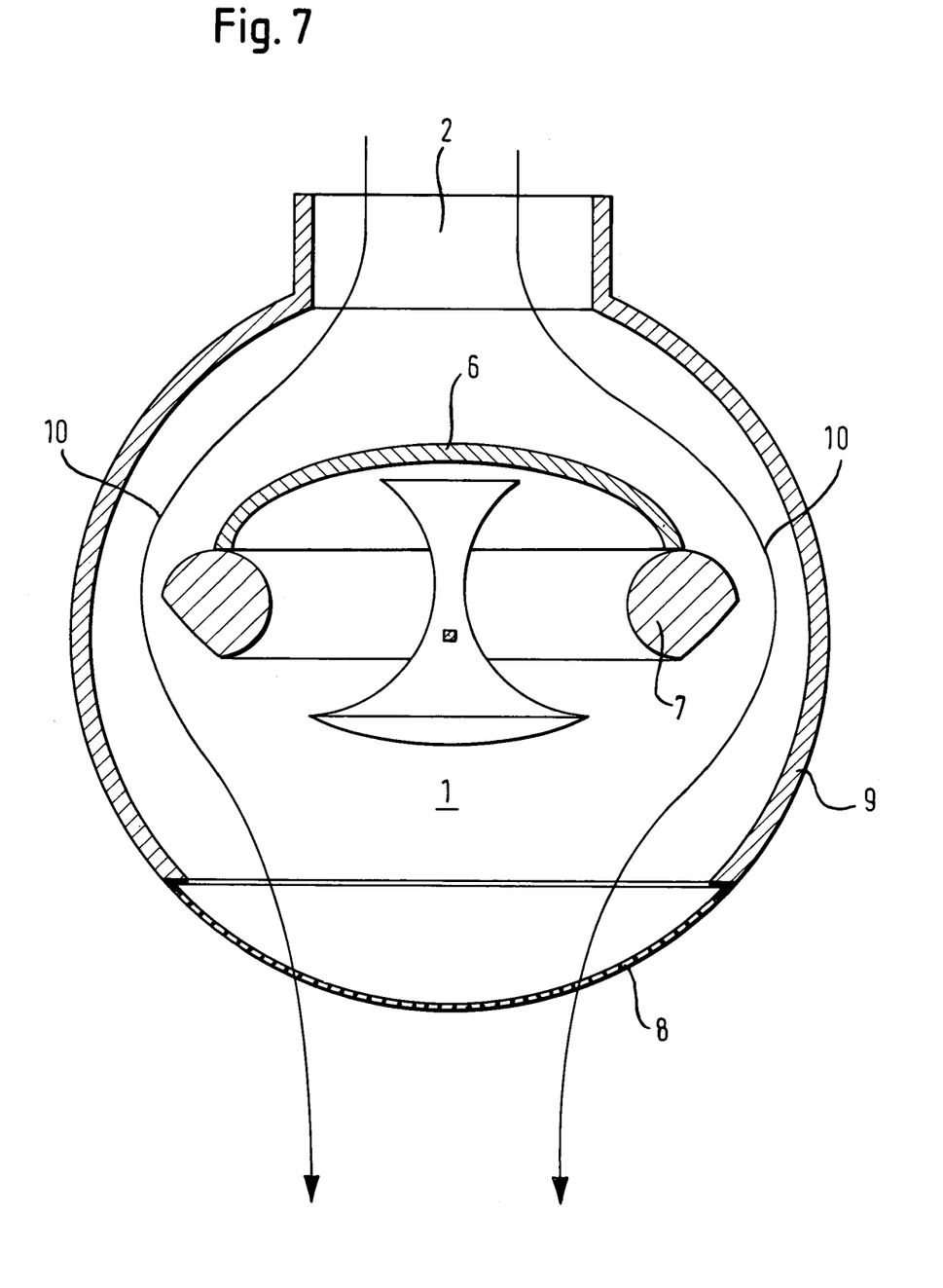
FIGS. 7 to 9 show another embodiment of the air vent according to the invention with the shield member and a diffuser structure in different positions.
Figure 8:
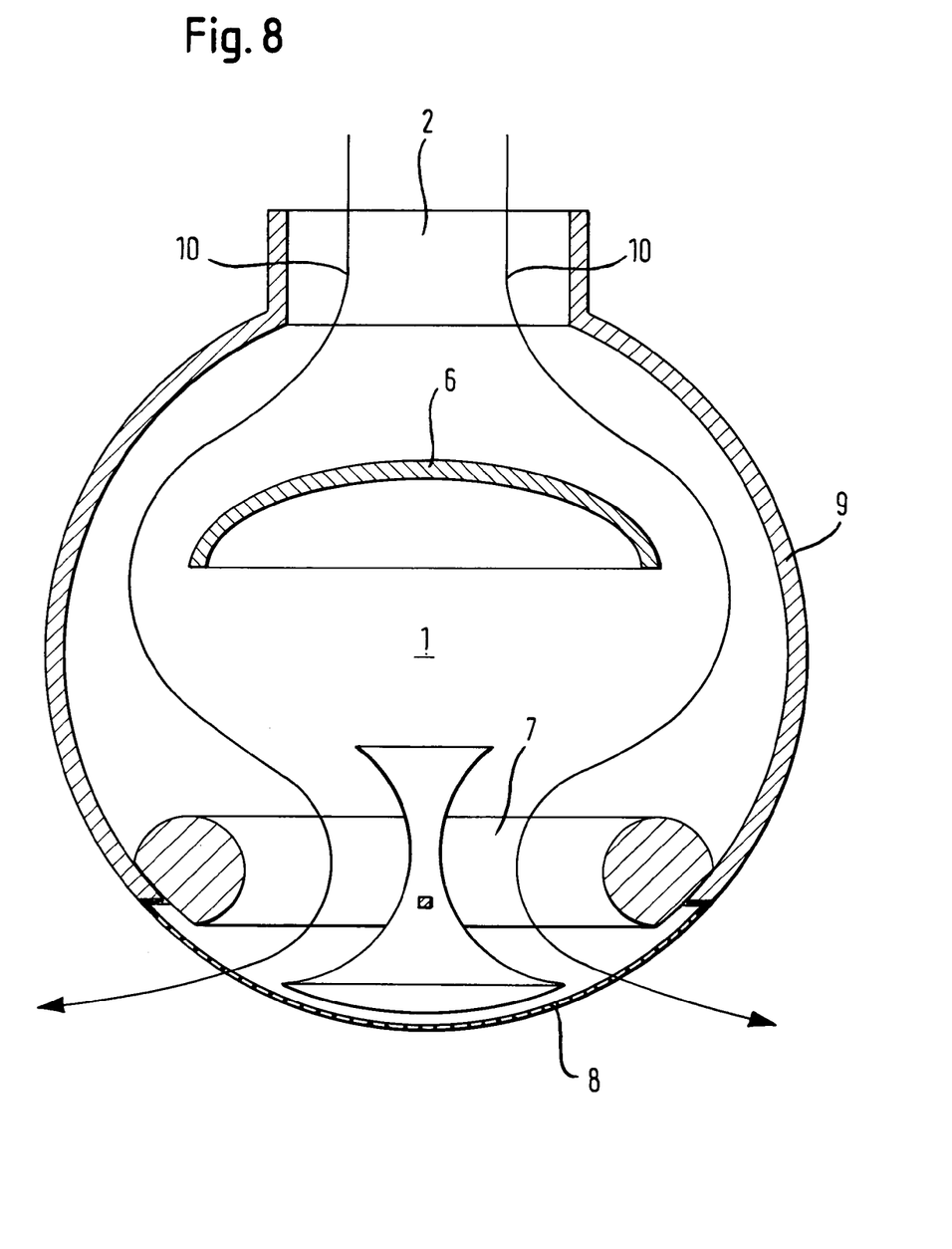

The mode of operation of diffuser structure 7 is explained with reference to FIGS. 7 and 8. Both figures show air circulation chamber 1 with an inflow duct 2, a shield member 6 and a diffuser structure 7. The annular diffuser structure 7 comprises an outer ring and a central deflection body that has a concave peripheral surface of revolution. In FIG. 7, shield member 6 and diffuser structure 7 are immediately adjacent to each other. Thus, the shield member is in a covering position in which it covers the diffuser structure. The inflowing air 10 is deflected by shield member 6 and guided around the outside of diffuser structure 7. Diffuser structure 7 does not have any effect on the air flow. The perforated wall area, formed by a fine-meshed grid 8, bundles the air flow that escapes in a sharp air jet. The air flowing out of the air vent is directed axially. The fine-meshed grid 8 does not influence the direction of the air flow.

Diffuser structure 7 is movable in air circulation chamber 1 towards and away from the perforated wall area. In FIG. 8, diffuser structure 7 is shifted in the direction of the perforated wall area. The end face of the central deflection body of diffuser structure 7 which is opposite to the perforated wall area is adapted to cover a central part of the perforated wall area and is here moved into contact with the fine-meshed grid 8. Shield member 6 no longer covers diffuser structure 7. The air 10 flowing past shield member 6 now flows through diffuser structure 7. The air outflow is diffuse.

Figure 9:
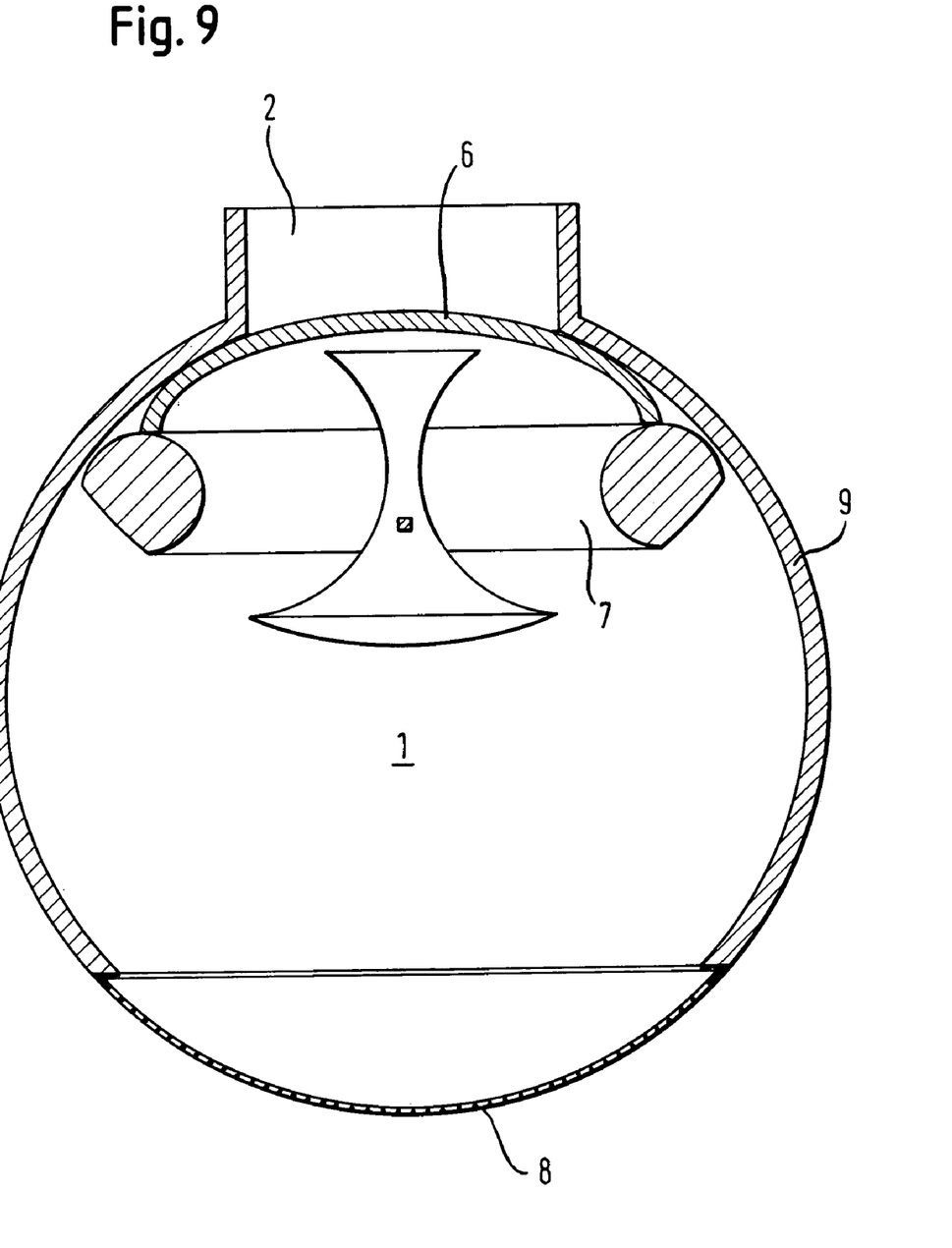

In FIG. 9, shield member 6 and diffuser structure 7 are moved into a shut-off position. Shield member 6 is movable inside air circulation chamber 1 in an axial direction towards and away from an opening in housing 9 where inflow duct 2 is connected to the housing 9. Shield member 6 closes off inflow duct 2 so that no more air enters air circulation chamber 1. With this shut-off position, the air flow through the air vent according to the invention can be completely prevented.

What is claimed is:

1. An air vent for a ventilation system in a vehicle, comprising an air circulation chamber (1) defined by a housing that has a generally bulged shape, an inflow duct (2) connected to said housing and opening into the circulation chamber (1), the housing having a perforated wall area (3), an air stream, in use, entering the circulation chamber (1) through said inflow duct (2), circulating through the air circulation chamber and exiting through the perforated wall area (3), and further comprising a movable air deflection member (4; 6) disposed to deflect the air stream transversely to an axial direction of said inflow duct (2), wherein the air deflection member (4) has a generally ball-shaped body which is rotatably accommodated in an annular bearing seat in the end of the inflow duct (2), and which defines a channel section of cylindrical shape that extends diametrically through the ball-shaped body.

2. The air vent according to claim 1, wherein an air guide (5) is arranged in the air circulation chamber (1) adjacent to the perforated wall area (3).

3. The air vent according to claim 2, wherein the air guide (5) comprises a continuous wall that is spaced from and extends parallel to said perforated wall area.

4. The air vent according to claim 2, wherein the air guide includes a set of curved baffle members (11) at fixed positions in the air circulation chamber upstream of said perforated wall area (3).

5. The air vent according to claim 2, wherein the air guide includes a set of straight baffle members (12) pivotally mounted in the air circulation chamber upstream of said perforated wall area (3).

* * * * *

UNITED STATES PATENT AND TRADEMARK OFFICE
CERTIFICATE OF CORRECTION

PATENT NO. : 7,201,650 B2
APPLICATION NO. : 10/791206
DATED : April 10, 2007
INVENTOR(S) : Demerath et al.

It is certified that error appears in the above-identified patent and that said Letters Patent is hereby corrected as shown below:

On Title page
    Item "(73) Assignee: TRW Automobile Electronics & Components GmbH & Co. KG, Enkenbach-Alesborn (DE)," should be -- (73) Assignee: TRW Automotive Electronics & Components GmbH & Co. KG, Enkenbach-Alsenborn (DE) --.

Signed and Sealed this

Thirteenth Day of May, 2008

JON W. DUDAS
*Director of the United States Patent and Trademark Office*